(12) United States Patent
Stoddard

(10) Patent No.: US 7,350,514 B2
(45) Date of Patent: Apr. 1, 2008

(54) SYSTEM FOR VAPORIZING LIQUID FUEL

(76) Inventor: Donald Joseph Stoddard, P.O. Box 540, Lincoln City, OR (US) 97367

(*) Notice: Subject to any disclaimer, the term of this patent is extended or adjusted under 35 U.S.C. 154(b) by 0 days.

(21) Appl. No.: 11/059,831

(22) Filed: Feb. 16, 2005

(65) Prior Publication Data

US 2005/0188964 A1 Sep. 1, 2005

Related U.S. Application Data

(60) Provisional application No. 60/549,230, filed on Mar. 1, 2004.

(51) Int. Cl.
*F02G 5/00* (2006.01)
(52) U.S. Cl. .................... 123/549; 123/557
(58) Field of Classification Search ............ 123/549, 123/557; 219/205–207
See application file for complete search history.

(56) References Cited

U.S. PATENT DOCUMENTS

| | | | |
|---|---|---|---|
| 1,640,902 A * | 8/1927 | Litle, Jr. .................... 123/548 |
| 3,868,939 A * | 3/1975 | Friese et al. ........... 123/179.15 |
| 4,283,917 A | 8/1981 | Proffer |
| 4,303,050 A * | 12/1981 | Platzer, Jr. ................ 123/549 |
| 4,325,344 A | 4/1982 | Igashira |
| 4,325,345 A * | 4/1982 | Wilkinson et al. .......... 123/557 |
| 4,347,826 A | 9/1982 | Nomura |
| 4,387,690 A * | 6/1983 | Chiavaroli ............... 123/549 |
| 4,407,254 A | 10/1983 | Kato |
| 4,412,521 A | 11/1983 | Silva |
| 4,477,715 A * | 10/1984 | Bell et al. .................. 219/205 |
| 4,483,304 A * | 11/1984 | Yokoi et al. ............... 123/549 |
| 4,811,719 A * | 3/1989 | Baumann ................... 123/557 |
| 5,152,272 A | 10/1992 | Scherenberg |
| 5,355,456 A | 10/1994 | Osofsky |
| 5,568,800 A | 10/1996 | Einaudi |
| 5,778,860 A | 7/1998 | Garcia |
| 5,947,091 A * | 9/1999 | Krohn et al. .............. 123/549 |
| 6,040,557 A * | 3/2000 | Prust et al. ................ 219/206 |
| 6,189,516 B1 | 2/2001 | Hei Ma |
| 6,557,535 B2 | 5/2003 | Stone |
| 6,606,976 B2 | 8/2003 | Nagano |
| 6,681,749 B2 | 1/2004 | Bushnell |
| 6,758,194 B2 * | 7/2004 | Shetley et al. ............. 123/557 |
| 6,769,421 B2 | 8/2004 | Newhouse |
| 2001/0050075 A1 * | 12/2001 | Lerner ..................... 123/593 |
| 2002/0092508 A1 * | 7/2002 | Kanekawa et al. ......... 123/543 |
| 2004/0025852 A1 * | 2/2004 | Kanekawa et al. ......... 123/549 |

* cited by examiner

*Primary Examiner*—Marguerite McMahon
(74) *Attorney, Agent, or Firm*—Conley Rose, P.C.

(57) ABSTRACT

The vaporizing liquid fuel system converts virtually all of the liquid passing through it to a vapor state for chemical or physical processes in the vapor state. One chemical process is combustion in an engine or fuel burning apparatus such as a heating device. The evaporator is comprised of a vapor chamber enclosed by a tube having liquid inlet and vapor outlet ports. The vapor chamber is virtually filled with a thermally conductive vaporizing surface. In the preferred embodiment the thermally conductive vaporizing surface is bonded to the inner surface of the tube. Heat is applied to the other surface and is conducted into the thermally conductive vaporizing surface where vaporization occurs. Heat may be supplied by a resistive film heater bonded to the outer surface of the tube, by heat conducted from a fuel burning system, by heat carried by fluid circulated from a fuel burning system.

20 Claims, 9 Drawing Sheets

Inlet Port End View of Evaporator

Side View of Evaporator

Outlet Port End View of Evaporator

Inlet Port End View
of Evaporator

Side View of
Evaporator

Outlet Port End View
of Evaporator

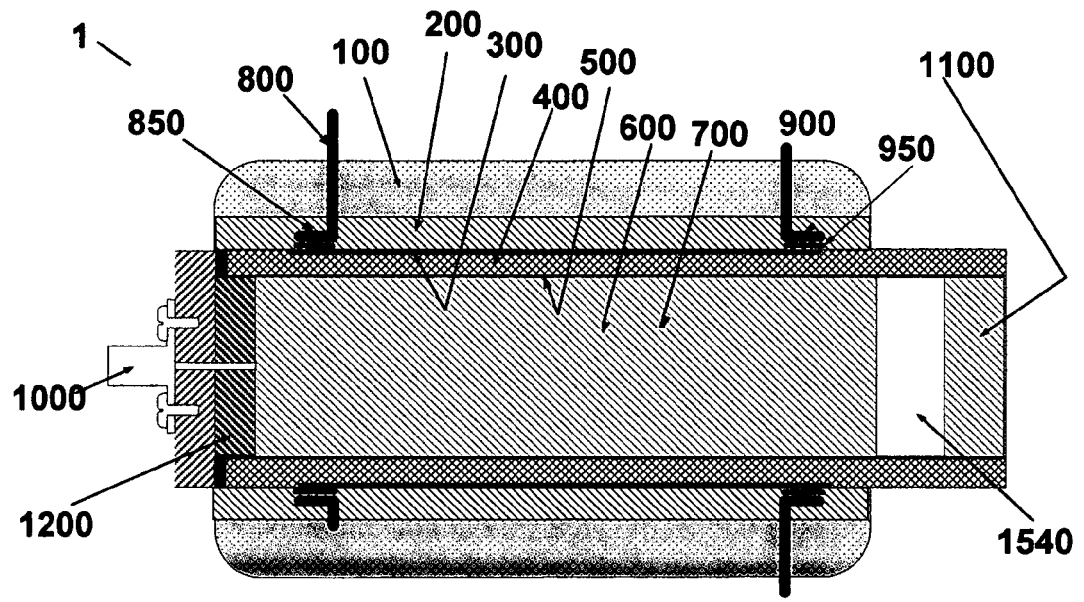
Fig. 2A Cross-Section of Evaporator
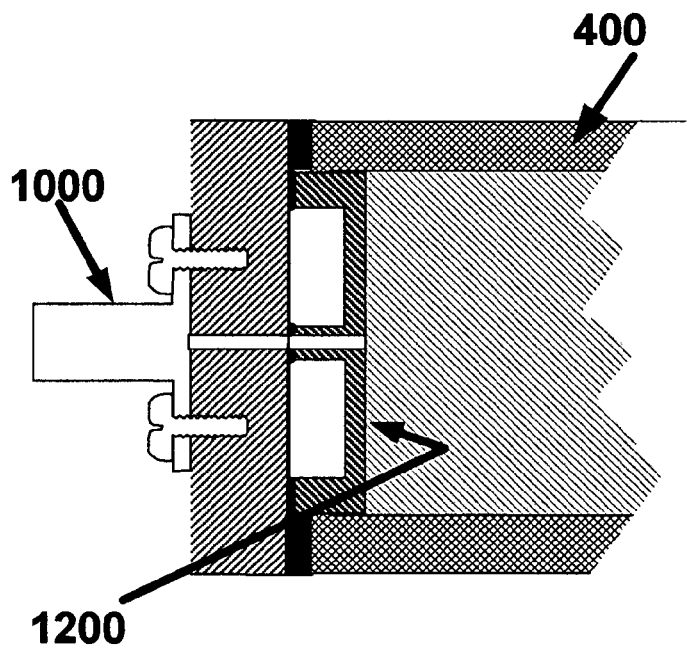
Fig. 2B Partial Cross-Section showing inlet port thermal plate

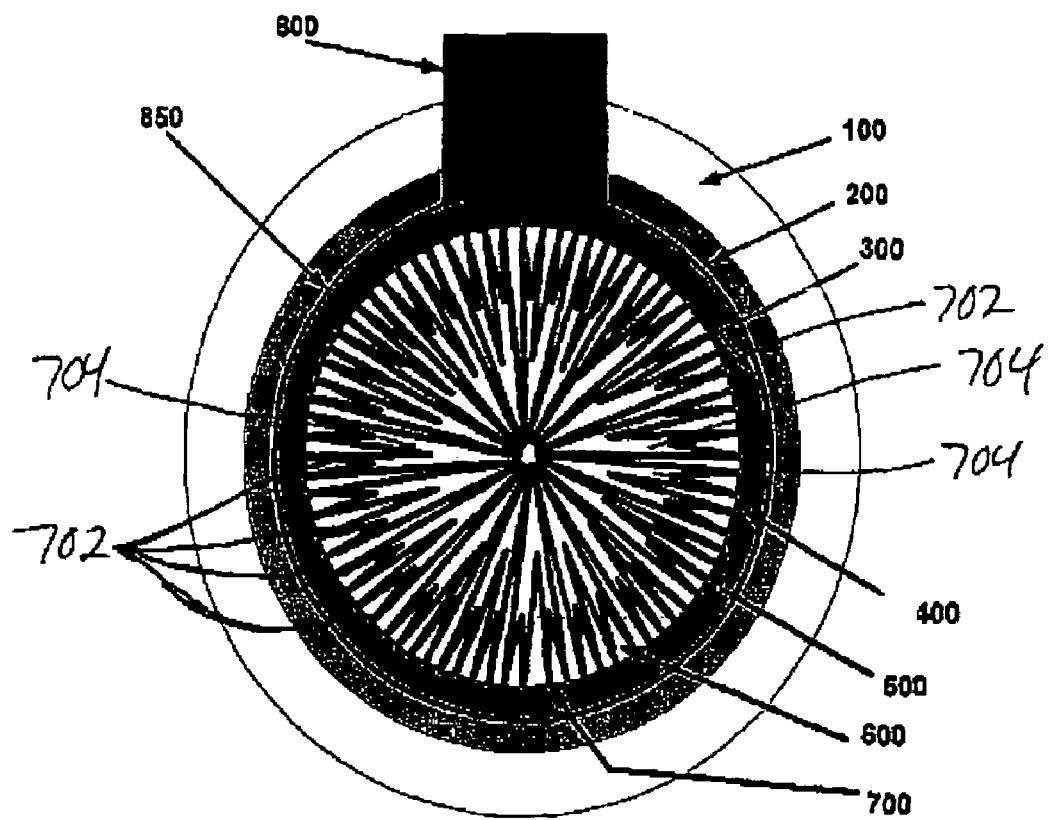
Fig 3. Cross-sectional view through the thermally conductive vaporizing surface

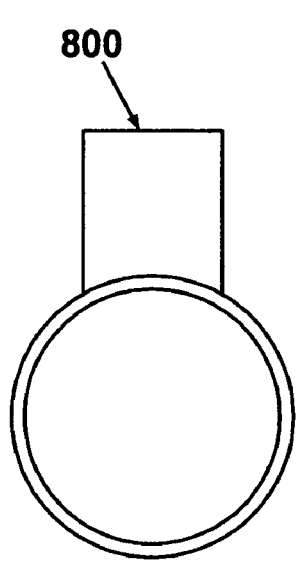
Fig. 4A Heater Supply Terminal
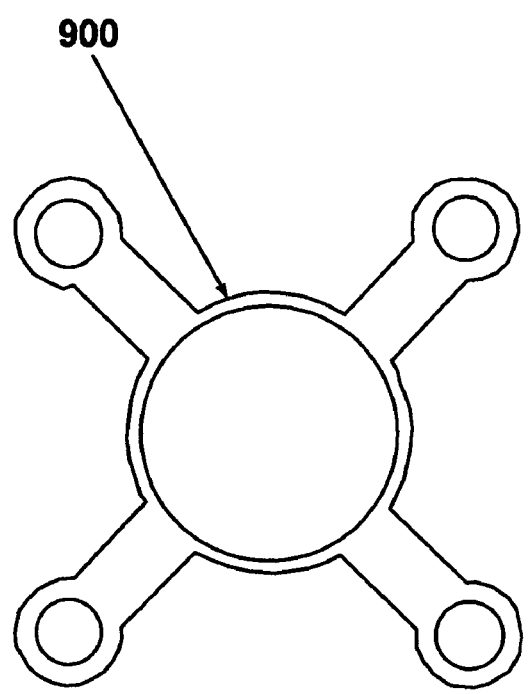
Fig. 4B Power Return Terminal

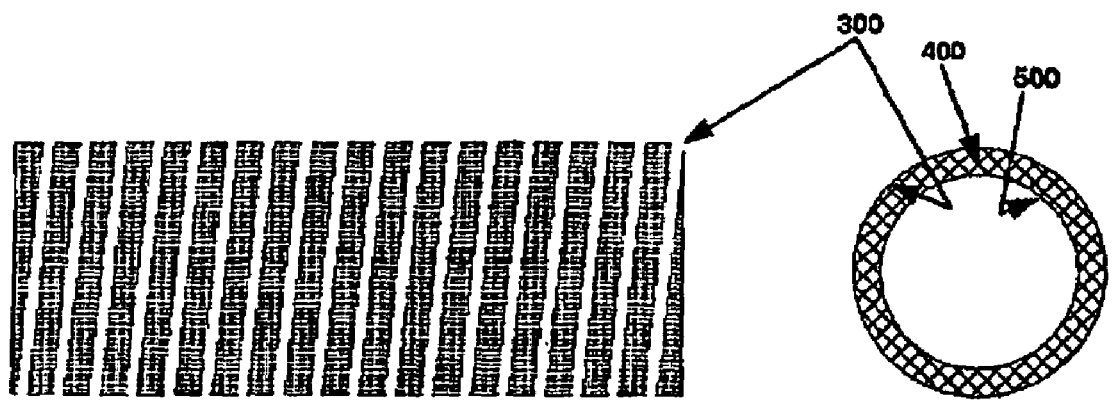
Fig 5a. Spiral Heater Resistor Side View
Fig 5b. Spiral Heater Resistor and Ceramic Tube End View

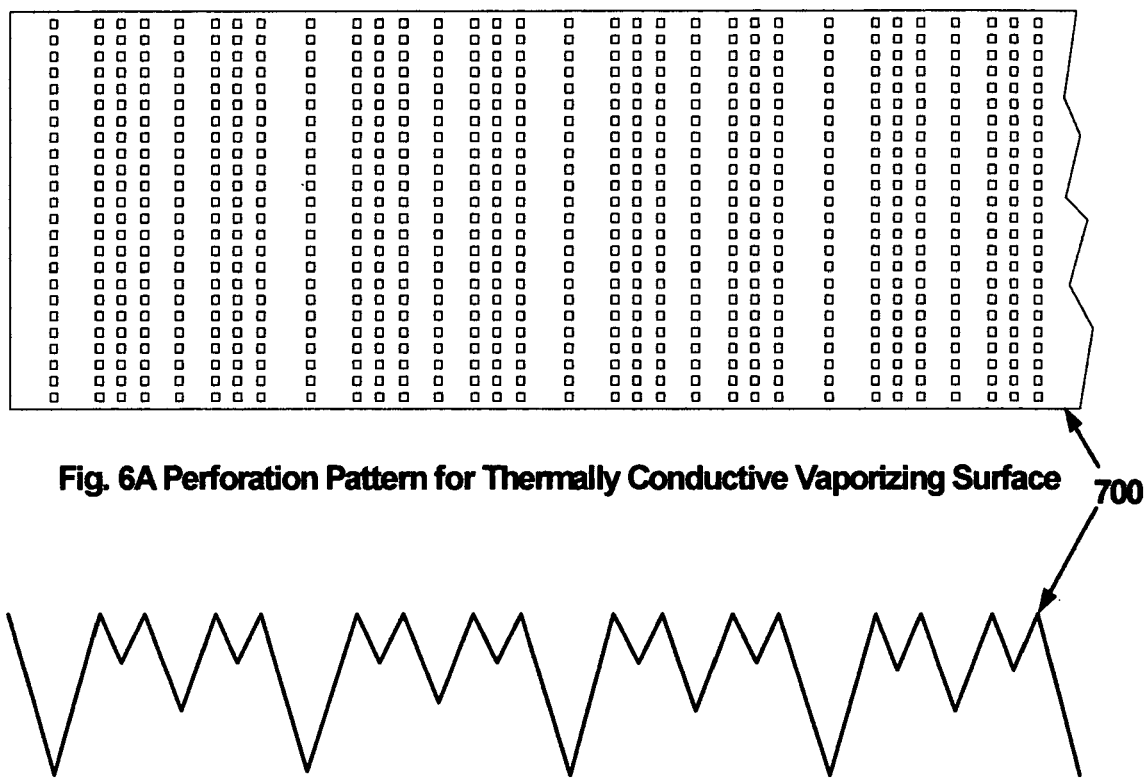
Fig. 6A Perforation Pattern for Thermally Conductive Vaporizing Surface 700
Fig. 6B End View - Perforated, Folded Metal Thermally Conductive Vaporizing Surface

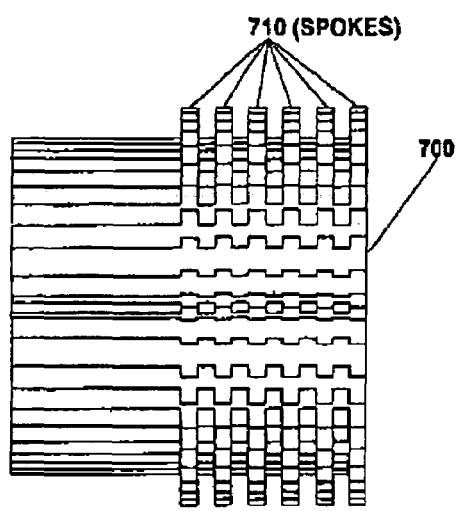
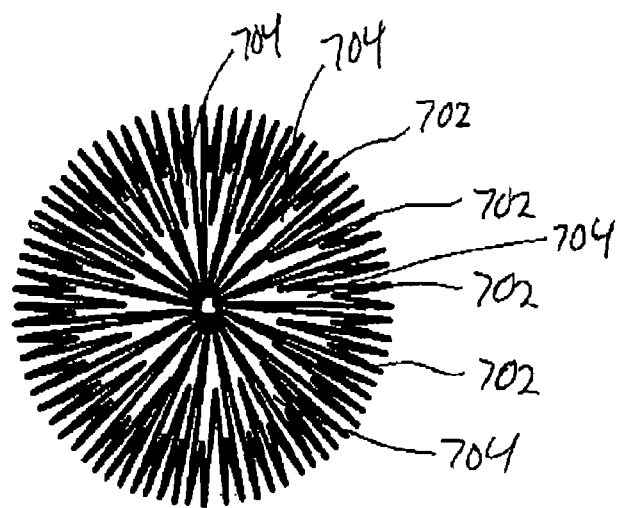
Fig 7a. Side View
Fig 7b. End View
Fig 7. Views of Thermally Conductive Vaporizing Surface

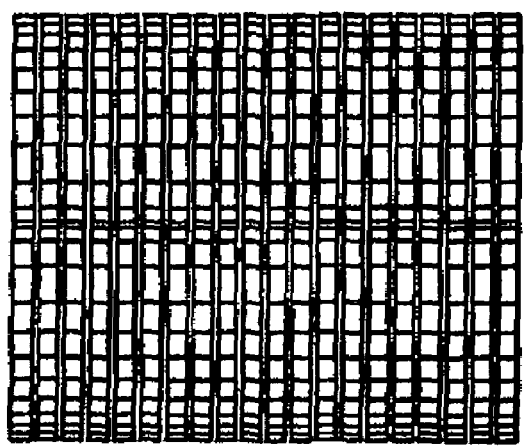 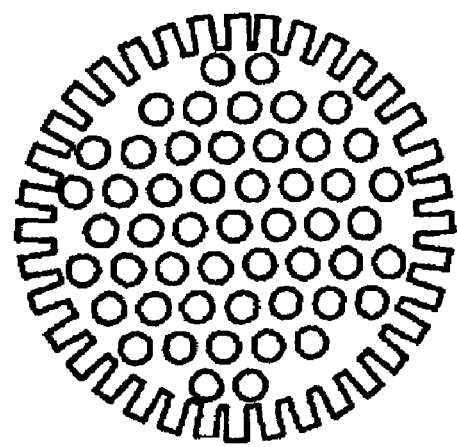
Fig 8a Side View  Fig 8b End View
Fig 8. Thermally Conductive Vaporizing Surface Disk Assembly

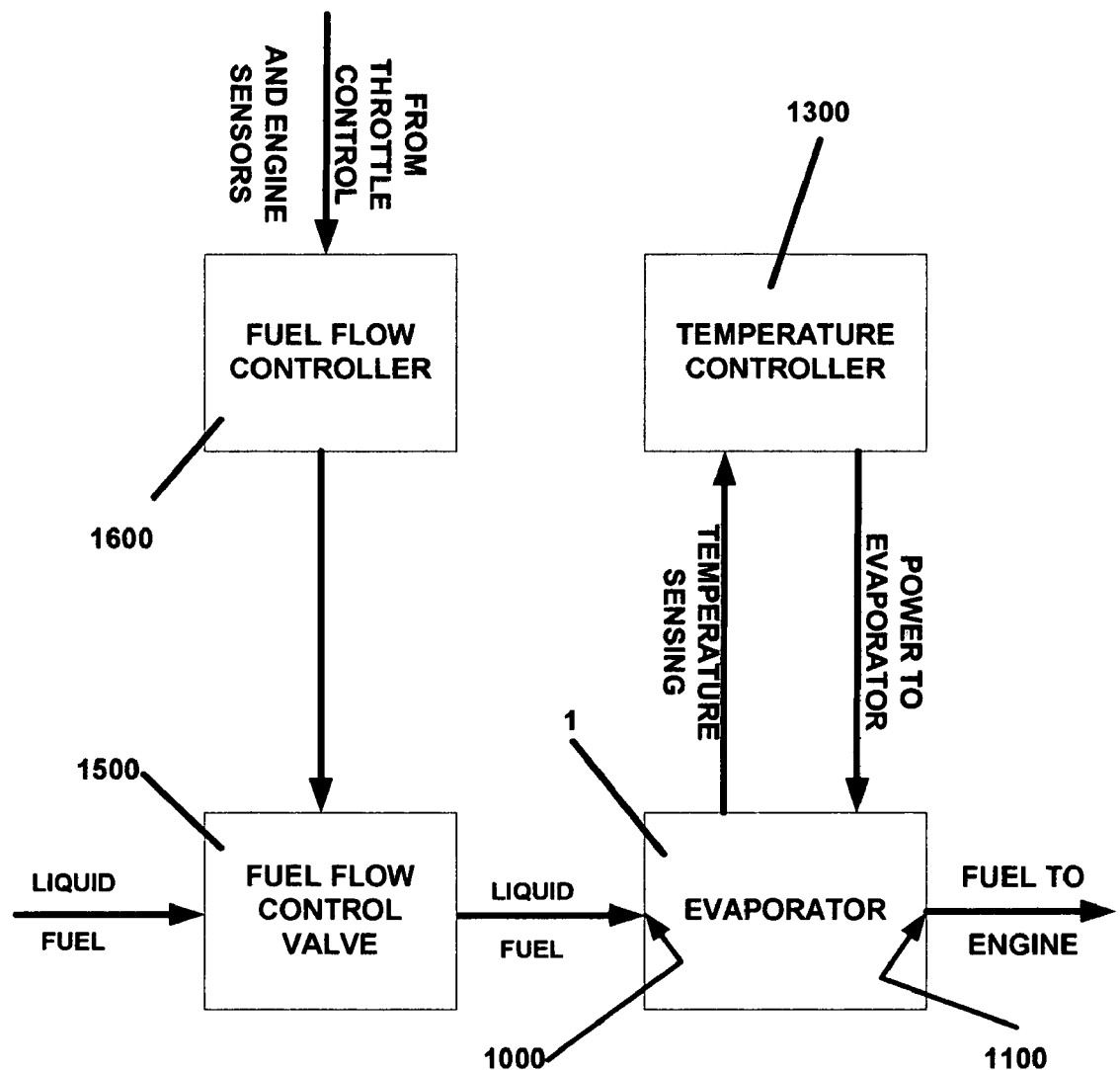
Fig. 9 Block Diagram of Fuel Evaporator System

SYSTEM FOR VAPORIZING LIQUID FUEL

CROSS-REFERENCE TO RELATED APPLICATIONS

This application claims priority to Provisional Application Ser. No. 60/549,230, filed on Mar. 1, 2004.

This application hereby incorporates by reference the following co-assigned U.S. patent application, entitled "System for Vaporizing Liquid Fuel in an Automobile".

BACKGROUND OF THE INVENTION TECHNOLOGY

1. Field of the Invention

The present disclosure relates generally to reducing fuel consumption.

2. Description of the Related Art

Gasoline is a limited resource that is the backbone of global economies. As supplies dwindle, fuel costs will continue to increase. Individual consumers and businesses need ways to reduce fuel consumption. One option is to improve gasoline mileage. Ongoing efforts to improve gasoline mileage include hybrid cars that are more expensive. Many newer cars weigh less and generally achieve better gas mileage. However, consumers and businesses that can only afford older cars have little option but to use what they have.

Introduction of fuel-injection systems with better performance has made carburetor systems obsolete. However, both systems share the same limitations. In both systems liquid fuel is either injected (sprayed under relatively high pressure) into the air stream, or dispersed by carburetor jets (low pressure) into the air stream. Fuel injectors simply produce smaller fuel droplets. If liquid fuel is not fully vaporized, small droplets are formed. At a molecular scale, these droplets regardless of their size are comprised of very large numbers of fuel molecules. As combustion begins, only the surface layer of the droplet is burned. Combustion products surround the unburned fuel droplet and slow further combustion. As a result fuel is wasted and unburned fuel pollutes the environment and contaminates engine oil.

Many fuel evaporators have been developed over the years. However, none of them has become commercially available. The prior art solutions have several limitations. Many systems include a means to return fuel that does not evaporate to the fuel tank. It appears substantially full vaporization has not been consistently achieved. Numerous problems have made prior fuel evaporator systems impractical.

While fuel vaporization has held great promise it has not proven commercially viable. In addition, the new vehicles that get better mileage are often beyond the means of many consumers. This leaves cost conscious consumers and businesses without any means to remedy the effects of high fuel costs.

SUMMARY OF THE INVENTION

Therefore there is a need for a low cost, effective means to reduce fuel consumption in both new and used gasoline powered cars. In order to improve gasoline mileage for most users, a solution must be affordable, available and adaptable for most new and used cars on the market.

A technical advantage of the present invention is substantially full vaporization of liquid fuel. Still another technical advantage is simplicity of design that makes it easily adaptable to existing systems. Yet another technical advantage is compact size so it fits easily into existing systems. Another technical advantage is use of readily available low-cost materials and ease of manufacturing. Another technical advantage is ease of starting in extremely cold weather. Another technical advantage is ease of insulation to provide protection from contact burns. Other technical advantages should be apparent to one of ordinary skill in the art in view of what has been disclosed herein.

BRIEF DESCRIPTION OF THE DRAWINGS

A more complete understanding of the present disclosure and advantage thereof may be acquired by referring to the following description taken in conjunction with the accompanying drawings wherein:

FIG. 2A and FIG. 2B are cross-sections views of the evaporator.

FIG. 3 is a cross-sectional view through the thermally conductive vaporizing surface.

FIG. 4A and FIG. 4B depict plan views of the heater power supply terminal and the heater power return terminal.

FIG. 5A is a side view of one embodiment of the resistive film heater in which the resistor is formed in a spiral around the tube. FIG. 5B is an end view of the resistive film heater showing the tube that supports and electrically isolates the resistive film heater.

FIG. 6A depicts a perforation pattern for the thermally conductive vaporizing surface. FIG. 6B depicts an end view of the thermally conductive vaporizing surface partially folded in preparation for insertion into the vapor chamber.

FIG. 7A is a side view of the thermally conductive vaporizing surface ready for insertion and brazing into the vapor chamber. FIG. 7B is an end view of the thermally conductive vaporizing surface folded and ready for insertion into the vapor chamber.

FIG. 8A and FIG. 8B depict side view and end view respectively of a thermally conductive vaporizing surface made of laminated, perforated disks.

FIG. 9 is a block diagram of the fuel evaporator system.

Figure 1A:
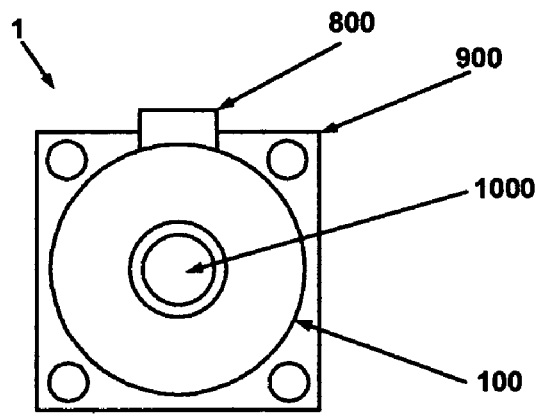
FIG. 1A is an inlet port end view of the evaporator.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

The vaporizing liquid fuel system is comprised of heat sources, thermal paths, vaporization surfaces, fuel flow controls, and fuel flow paths for both inlet liquid and outlet vapor. In addition, thermal insulation may minimize heat loss and protect individuals from contact burn hazard.

Referring now to the drawings, the details of specific exemplary embodiments of the present invention are illustrated. Like elements in the drawings will be represented by like numbers.

Figure 1B:
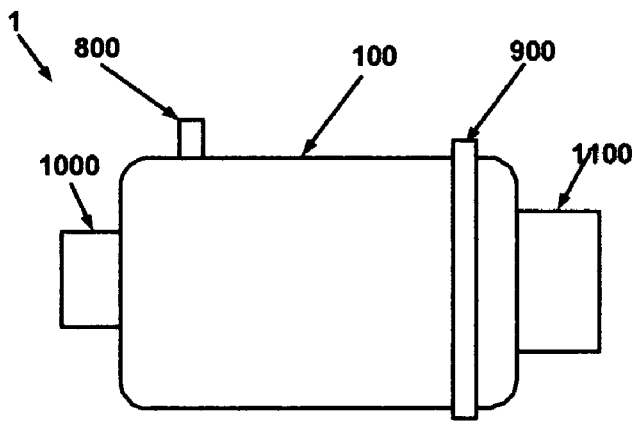
FIG. 1B is a side view of the evaporator.
Figure 1C:
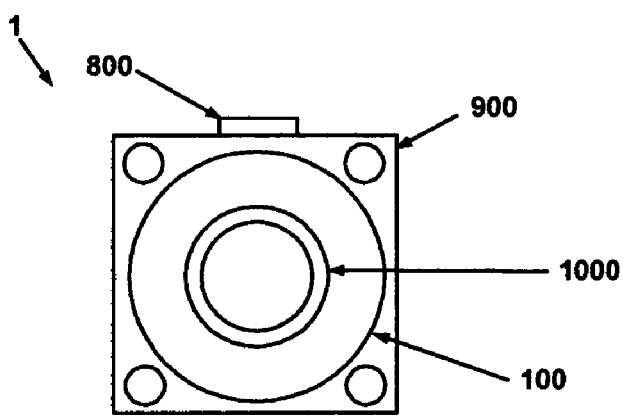
FIG. 1C is an outlet port end view of the evaporator.

Referring now to FIG. 1A, depicted is an inlet port end view of the evaporator 1. The heater supply terminal 800 protrudes above the body of evaporator 1. The heater power return terminal 900 has mounting holes that provide ground connections. The liquid fuel inlet port 1000 receives liquid fuel. The outer thermal insulation 100 helps reduce burn hazard and minimizes heat loss. FIG. 1B presents a side view of the evaporator 1. The tube 400 extends from the evaporator 1 for insertion into the engine manifold. FIG. 1C is an outlet port end view of the evaporator 1.

FIGS. 2A, 2B and 3, depict cross-sectional diagrams of the evaporator 1, according to teachings of the present disclosure. FIG. 2A, depicts a cross sectional side view of the evaporator 1. The vapor chamber 600 is enclosed by a tube 400 and by an inlet port 1000 and a vapor outlet port 1100. The tube 400 may be made of electrically non-conducting material or insulated metal. The preferred embodiment may use ceramic such as alumina. An alternate embodiment may use metal with enamel or functionally similar material. The vapor chamber 600 is virtually filled with a thermally conductive vaporizing surface 700 that is bonded to the inner surface metal 500 of the ceramic or metal tube 400. The thermally conductive vaporizing surface 700 may be made of one or more pieces of thermally conductive material. The thermally conductive vaporizing surface 700 may also use thermally conductive porous material such as reticulated metal foam. Reticulated foam is an open cell material through which fluids may pass easily and which is thermally conductive.

The inlet port 1000 connects to the fuel source or output of a fuel-regulating device. In a preferred embodiment, a fuel-regulating device such as an injector may be integrated into the inlet port 1000. The open end of the tube 400 forms the vapor outlet port 1100. A vapor flow control valve 1540 may be placed between vapor chamber 600 and the vapor outlet port 1100. The outer diameter of the evaporator 1 is covered with an inner thermal insulator 200 and an outer thermal insulator 100. A single layer may be used. Use of multiple layers may further reduce heat loss and may enable use of less expensive material on the outer cooler layers. An inlet port thermal plate 1200 is bonded to the inside surface of the inlet port 1000. A resistive film heater 300 is fused into the outer surface of the tube 400. The heater supply terminal 800 is attached to the resistive film heater 300 through a bond 850. The heater power return terminal 900 is attached to the other end of the resistive film heater 300 through a bond 950.

Referring now to FIG. 3, depicted is a cross-section view of the evaporator 1 through the thermally conductive vaporizing surface 700. The resistive film heater 300 attaches to the tube 400 outer surface. Heat flows from the perimeter of the tube 400 thereby creating a very wide heat conduction path. As a result there is small temperature difference between the resistive film heater and the inner surface metal 500 of the tube 400. The thermally conductive vaporizing surface 700 attaches to the inner surface metal 500 and fills the vapor chamber 600. The multiplicity of conduction paths 702 and liquid fuel passages 704 help further minimize temperature drop between the heat source and the interior of the vapor chamber 600. This low temperature drop may enable use of less expensive material. Bonding material 850 connects the resistive film heater 300 to the heater power supply terminal 800. Thermal insulators 100 and 200 cover the outside of the evaporator 1.

Referring to FIG. 4A and FIG. 4B, depicted are the heater contact terminals. The heater supply terminals 800 and power return terminal 900 use a material that expands and contracts with temperature the same as the tube 400 material. The heater supply terminal 800 and the power return terminal 900 are attached to ends of the resistive film heater 300. A tab may be extended from the heater supply terminal 800 for external connection. The power return terminal 900 as shown in FIG. 4B may have one or more extended arms with holes in the outer ends. The holes may provide a way to mount the evaporator 1. The narrow extensions to the mounting holes increase thermal resistance from the resistive film heater 300 to the external environment and in particular to the mounting structures. Higher thermal resistance in this path may help maintain uniform temperature on the resistive film heater 300. It may also reduce heat loss and power required to operate the evaporator 1.

Referring now to FIG. 5A, depicted is a spiral pattern of the resistive film heater 300 attaching to the tube 400. If the resistive film heater 300 material has low electrical resistivity, a long narrow pattern on the tube 400 may be required. The spiral pattern is a long narrow pattern. FIG. 5A shows a side view of a spiral resistor pattern on the tube 400. FIG. 5B is an end view of the resistive film heater 300 showing the tube 400 that supports and electrically isolates the resistive film heater 300.

FIGS. 6A, 6B, 7A and 7B, depict the preferred embodiment of the thermally conductive vaporizing surface 700. An evaporator 1 must have large surface area and small passages 704 for full vaporization of liquid. One embodiment is described below. FIG. 6A shows a perforation pattern in a sheet of material having high thermal conductivity. FIG. 6B shows folds partially formed in the material. The folds are made through the centers of the rows of perforations. Using a pattern as shown produces folds of various depths as shown in FIG. 6B and FIG. 7B. A lesser number of deep folds extend to the center of the vapor chamber 600 while a larger number of folds end nearer the outer perimeter. This arrangement distributes the thermally conductive vaporizing surface 700 more uniformly within the vapor chamber 600. The metal between perforations become spokes 710 as shown in FIG. 7A and FIG. 7B, when the part is folded.

Referring now to FIGS. 8A and 8B, depicted is an alternate embodiment for the thermally conductive vaporizing surface 700 laminated from disks that are perforated to allow liquid and vapor fuel to pass through.

Referring to FIG. 9, depicted is an exemplary application of the evaporator 1. The fuel flow controller 1600 controls the output of the fuel flow control valve 1500. The liquid fuel feeds into the input of the fuel flow control valve 1500 that transmits fuel into the inlet port 1000 of the evaporator 1. Also shown is the temperature controller 1300 that receives power (not shown) from the operating system and supplies regulated power to the evaporator 1. The temperature controller 1300 receives temperature readings from one or more temperature sensors (not shown) in the evaporator 1 or in the vapor outlet port 1100. Power to the evaporator 1 is adjusted to provide full vaporization as indicated by the above temperature sensors.

The invention, therefore, is well adapted to carry out the objects and to attain the ends and advantage mentioned, as well as others inherent therein, While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those of ordinarily skilled in the pertinent arts and having the benefit of this disclosure. The depicted, and described embodiments of the invention are exemplary only, and are not exhaustive of the scope of the invention.

Consequently, the invention is intended to be limited only by the spirit and scope of the appended claims, giving full cognizance to equivalents in all respects.

What is claimed is:

1. A vaporizing liquid fuel system for delivering vaporized fuel from a liquid fuel source to an engine manifold comprising:
    a housing having at least one vapor chamber and a heat source, said vapor chamber including a thermally conductive vaporizing surface to receive heat from said heat source; said vaporizing surface comprising predominantly transverse metal folds extending inwardly from an inner surface of the vapor chamber, to form a multiplicity of conduction paths and a multiplicity of liquid fuel flow passages
    at least one fuel flow control valve disposed in said vapor chamber;
    a liquid fuel inlet port connected to the liquid fuel source; and
    a vapor outlet port connected to the engine manifold.

2. The vaporizing liquid fuel system according to claim 1, wherein said heat source is a resistive heater bonded to the surface of said vapor chamber.

3. The vaporizing liquid fuel system according to claim 2, wherein said resistive heater has at least one electrical connection.

4. The vaporizing liquid fuel system according to claim 1, wherein said heat source current is regulated by a temperature controller.

5. The vaporizing liquid fuel system according to claim 1, wherein said temperature controller senses at least one temperature internal or external to the evaporator.

6. The vaporizing liquid fuel system according to claim 1, wherein said thermally conductive vaporizing surface is constructed of parts arranged such that liquid passing through substantially continuously contacts said high thermal conductivity surface.

7. The vaporizing liquid fuel system according to claim 1, wherein said high thermal conductivity surface is made of a high thermal conductivity porous material.

8. The vaporizing liquid fuel system according to claim 1, wherein said thermally conductive vaporizing surface has a multiplicity of paths for heat transfer from the heat source.

9. The vaporizing liquid fuel system according to claim 1, wherein an inlet fuel flow control valve controls vapor in the vapor chamber.

10. The vaporizing liquid fuel system according to claim 1, wherein an outlet fuel control valve controls vapor flow from the vapor chamber into the outlet port.

11. The vaporizing liquid fuel system according to claim 1, wherein a heat pipe transfers heat to at least one surface of the vapor chamber.

12. A vaporizing liquid fuel system comprising:
    a tube;
    a heat-generating device;
    a temperature controller;
    a vapor chamber inside said tube;
    said vapor chamber having a liquid fuel inlet port and a vapor outlet port; and
    said vapor chamber containing a thermally conductive vaporizing surface extending from a perimeter of said vapor chamber toward a center of said vapor chamber such that heat is conducted from said heat-generating device and said vapor chamber perimeter toward said center of said vapor chamber, said vaporizing surface comprising predominantly transverse metal folds extending inwardly from an inner surface of the tubular vapor chamber, to form a multiplicity of conduction paths and a multiplicity of liquid fuel flow passages.

13. The vaporizing liquid fuel system according to claim 12, wherein said tube is made of electrically insulating material.

14. The vaporizing liquid fuel system according to claim 12, wherein said heat generating device is a resistive heater.

15. The vaporizing liquid fuel system according to claim 14, wherein resistive heater is a resistive film bonded to the surface of said tube made of electrically insulating material.

16. The vaporizing liquid fuel system according to claim 12, wherein the tube is made of electrically conductive material.

17. The vaporizing liquid fuel system according to claim 16, wherein at least one side of the tube is electrically insulated.

18. The vaporizing liquid fuel system according to claim 17, wherein a resistive film heater is bonded to the electrically insulated surface of said electrically conductive tube.

19. A vaporizing liquid fuel system comprising:
    a tube;
    a heat-generating device;
    a temperature controller;
    a vapor chamber inside said tube;
    said vapor chamber having a liquid fuel inlet port and a vapor outlet port; and
    said vapor chamber containing a thermally conductive vaporizing surface including predominantly transverse metal folds extending inwardly from an inner surface of said tube to form a multiplicity of conduction paths and a multiplicity of liquid fuel flow passages.

20. The vaporizing liquid fuel system according to claim 19, wherein spacing between successive folds in said thermally conductive vaporizing surface are varied such that surface area per unit volume remains substantially constant throughout the vapor chamber.

* * * * *